United States Patent [19]

Tsubakimoto et al.

[11] Patent Number: 5,229,487
[45] Date of Patent: Jul. 20, 1993

[54] METHOD FOR METERED SUPPLY OF MATERIAL, APPARATUS THEREFOR, AND METHOD FOR PRODUCTION OF HYDROPHILIC POLYMER BY USE THEREOF

[75] Inventors: Tsuneo Tsubakimoto, Toyonaka; Takehiro Takashima, Himeji; Hitoshi Takahashi, Himeji; Teruaki Fujiwara, Himeji, all of Japan

[73] Assignee: Nippon Shokubai Kagaku Kogyo Co., Ltd., Osaka, Japan

[21] Appl. No.: 499,450

[22] PCT Filed: Oct. 27, 1989

[86] PCT No.: PCT/JP89/00108

§ 371 Date: Jun. 22, 1990

§ 102(e) Date: Jun. 22, 1990

[87] PCT Pub. No.: WO90/04557

PCT Pub. Date: May 3, 1990

[30] Foreign Application Priority Data

Oct. 28, 1988 [JP] Japan .................................. 63-270829

[51] Int. Cl.$^5$ .............................................. C08F 6/00
[52] U.S. Cl. ...................................... 528/484; 528/502
[58] Field of Search ................ 528/484, 502; 523/331

[56] References Cited

U.S. PATENT DOCUMENTS 4,138,539 2/1979 Landolt et al. .................. 528/502

FOREIGN PATENT DOCUMENTS

| 44-21839 | 9/1969 | Japan . |
| 4421839 | 9/1969 | Japan . |
| 56-3890 | 1/1981 | Japan . |
| 56-68739 | 6/1981 | Japan . |
| 57-9326 | 1/1982 | Japan . |
| A-935415 | 6/1982 | U.S.S.R. . |

Primary Examiner—Joseph L. Schofer
Assistant Examiner—David Wu
Attorney, Agent, or Firm—Burns, Doane, Swecker & Mathis

[57] ABSTRACT

A method for metered supply of a delivered material to the next step, which method is characterized by regulating the thickness of the material on a conveyor before the material in the process of transfer on the conveyor from the incoming end thereof to the outgoing end thereof reaches the outgoing end, removing portions of a prescribed amount one at a time from the upper side part of the material by means of a scraping member adapted to cut into the upper side part of the material causing the removed portions of the upper side part of the material to be discharged past the outgoing end of the conveyor by means of the scraping member and, at the same time, causing the lower side part of the material discharged into by the scraping member to be discharged past the outgoing end by means of the conveyor, and an apparatus therefor.

8 Claims, 5 Drawing Sheets

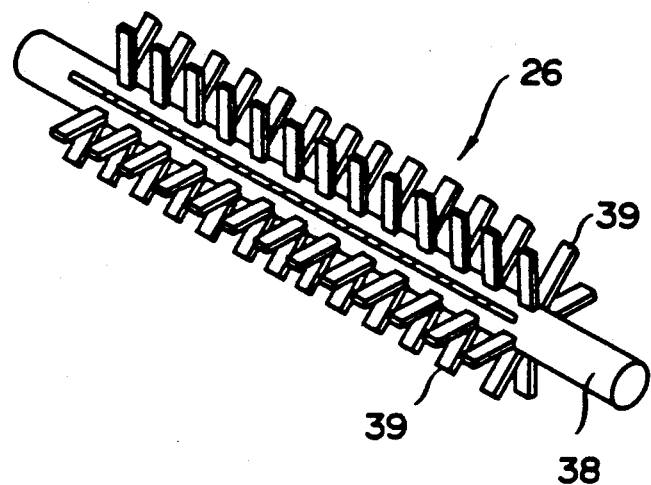
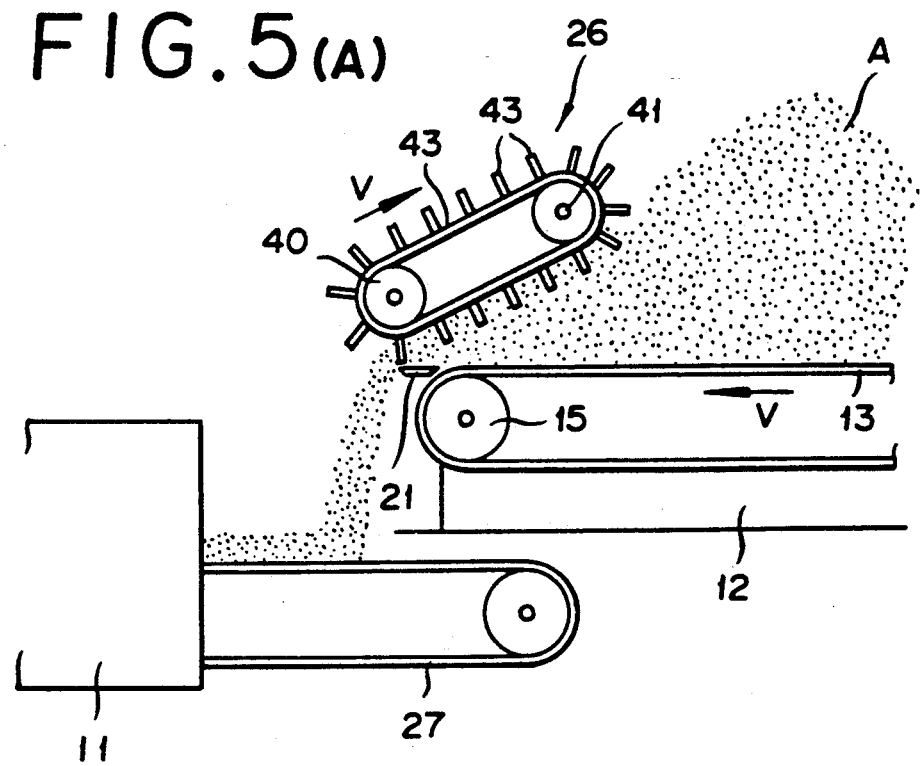

METHOD FOR METERED SUPPLY OF MATERIAL, APPARATUS THEREFOR, AND METHOD FOR PRODUCTION OF HYDROPHILIC POLYMER BY USE THEREOF

FIELD OF THE INVENTION

This invention relates to a method for metering the supply of a material, an apparatus for executing the method, and a method for the production of a hydrophilic polymer by the use of the apparatus. More particularly, this invention relates to a method for effecting metered supply of a wet material such as a hydrated gel substance, an apparatus for executing the method, and a method for efficient production of a hydrophilic polymer by the use of the apparatus.

BACKGROUND OF ART

For metered supply of a powdery substance or a granular substance, a belt conveyor, for example, has been used. The metered supply of a powdery substance or a granular substance by the use of a belt conveyor is accomplished by installing a switching gate or a roller over the conveyor thereby setting the thickness of the layer of the powdery or granular substance being forwarded on the conveyor at a prescribed value. When the conventional belt conveyor of the type described above is used for the purpose of transferring a viscous wet material such as a hydrated gel of hydrophilic polymer, such as absorbent resin, it is difficult to attain metered conveyance or supply of the wet material.

The gate or roller disposed above the belt conveyor is actuated while the hydrated gel of absorbent resin delivered to the incoming end of the belt conveyor is in the process of transfer in the direction of the outgoing end the thickness of the layer of the hydrated gel of absorbent resin on the conveyor is regulated to a fixed value. Since the hydrated gel possesses viscosity, it is destined to gain in bulk density when it is compacted under the pressure exerted thereon in the region of the gate. Once this increase of bulk density occurs, the metered supply of the hydrated gel can no longer be obtained with high accuracy because the hydrated gel being transferred in the form of a layer of a fixed thickness from the outgoing end of the belt conveyor to the next step of drying has undergone changes in specific gravity and volumetric ratio from the initial state. Further, since the increased bulk density results in degrading the permeability of the hydrated gel to the air, the hot air is incapable of permeating into the interior of the layer of hydrated gel and fulfilling a continuous drying work throughout the entire volume of the layer of hydrated gel and consequently part of the layer of hydrated gel remains undried.

Particularly for the purpose of drying a viscous material such as, for example, a wetted material, an aerating band type drier incorporating therein a band conveyor may be used. When this drier is used for drying the aforementioned hydrated gel, which has been compacted by pressure and consequently degraded in permeability to the air, the hot air is not sufficiently passed through the layer of the hydrated gel and the interior of the layer of the hydrated gel is dried very poorly. Thus, the layer of the hydrated gel reaching the outlet part of the drier inevitably contains an undried part. In the next step of pulverization, the undried part of the hydrated gel escapes pulverization and consequently adheres to and clogs the apparatus even to the extent of not only interfering with the work of continuous drying but also causing breakage of the apparatus in an extreme case.

Particularly when the hydrated gel of hydrophilic polymers such as absorbent resin is obtained by polymerizing a monomer component containing 50 to 100% by weight of acrylic acid (or a salt thereof), the disadvantage described above becomes all the more conspicuous because the viscosity exhibited independently or mutually by the individual particles of the gel is very high.

This invention has been produced by the urge to fulfill the imperfect prior art described above. When a material delivered to the incoming end of a conveyor is advanced in a large heap on the conveyor, given a fixed thickness by the use of a gate and then transferred in a prescribed rate to the next step, it must be released in a loose state to the next step even if the material is a wet substance. When the wet material in the process of transfer toward the outgoing end of the conveyor is given a small thickness by the gate, the wet material slips on the upper surface of the conveyor and cannot be effectively transferred by the conveyor.

When the wet material is given a sufficiently large thickness by the gate so as to avoid the phenomenon of slippage, it is not released in a loose state from the outgoing end of the conveyor. When the layer of the wet material is set at the aforementioned sufficiently large thickness by means of the gate, the bulk density of the wet material is increased throughout the entire width extent of the thickness. By causing the upper side part of the layer of the wet material to be scraped off with a scraping member and, meanwhile, allowing the lower side part thereof not discharged by the scraping member to be released from the outgoing end of the conveyor, the wet material can be continuously conveyed to the next step without being wholly compacted by pressure.

An object of this invention, therefore, is to provide a method for metering the supply of a material which permits therefor material to be transferred in a prescribed rate with high accuracy to the next step and an apparatus to be used therefor.

Another object of this invention is to provide a method for the efficient production of a hydrophilic polymer by causing a hydrated gel of hydrophilic polymer obtained by batch polymerization to be delivered in a prescribed rate with high accuracy into a drier and dried therein with high efficiency.

SUMMARY OF THE INVENTION

The objects described above are accomplished by a method for metering the supply of a delivered material to the next step, which method is characterized by regulating the thickness of the material on a conveyor before the material in the process of transfer on the conveyor from the incoming end thereof to the outgoing end thereof reaches the outgoing end, removing portions of a prescribed amount one at a time from the upper side part of the material by means of a scraping member adapted to cut into the upper side part of the material causing the removed portions of the upper side part of the material to be discharged past the outgoing end of the conveyor by means of the scraping member and, at the same time, causing the lower side part of the material not discharged by the scraping member to be discharged past the outgoing end by means of the conveyor.

The aforementioned objects are also accomplished by an apparatus for metering the supply of a delivered material to the next step, which apparatus is characterized by having a conveyor interposed between the incoming end and the outgoing end of the material as directed toward the outgoing end, having disposed above the outgoing end scraping means fitted with a scraping member adapted to cut into the upper side part of the material reaching the outgoing end causing the scraping member to remove portions from the upper side part of the material reaching the outgoing end and discharge the removed portions past the outgoing end and, at the same time, causing the conveyor to discharge past the outgoing end the lower side part of the material not discharged by the scraping member.

The objects described above are further accomplished by a method for the production of a hydrophilic polymer, which comprises metering the supply of the finely divided hydrated gel polymer obtained by batch polymerization to a drying device by the use of an apparatus for metering having a conveyor interposed between the incoming end and the outgoing end of the material as directed toward the outgoing end, having disposed above the outgoing end scraping means fitted with a scraping member adapted to cut into the upper side part of the material reaching the outgoing end causing the scraping member to remove portions from the upper side part of the material reaching the outgoing end, discharging the removed portions past the outgoing end and, at the same time, causing the conveyor to discharge past the outgoing end the lower side part of the material not discharged by the scraping member, and allowing the hydrated gel polymer to be dried with the drying means device.

BEST MODE FOR CARRYING OUT THE INVENTION

Figure 1:
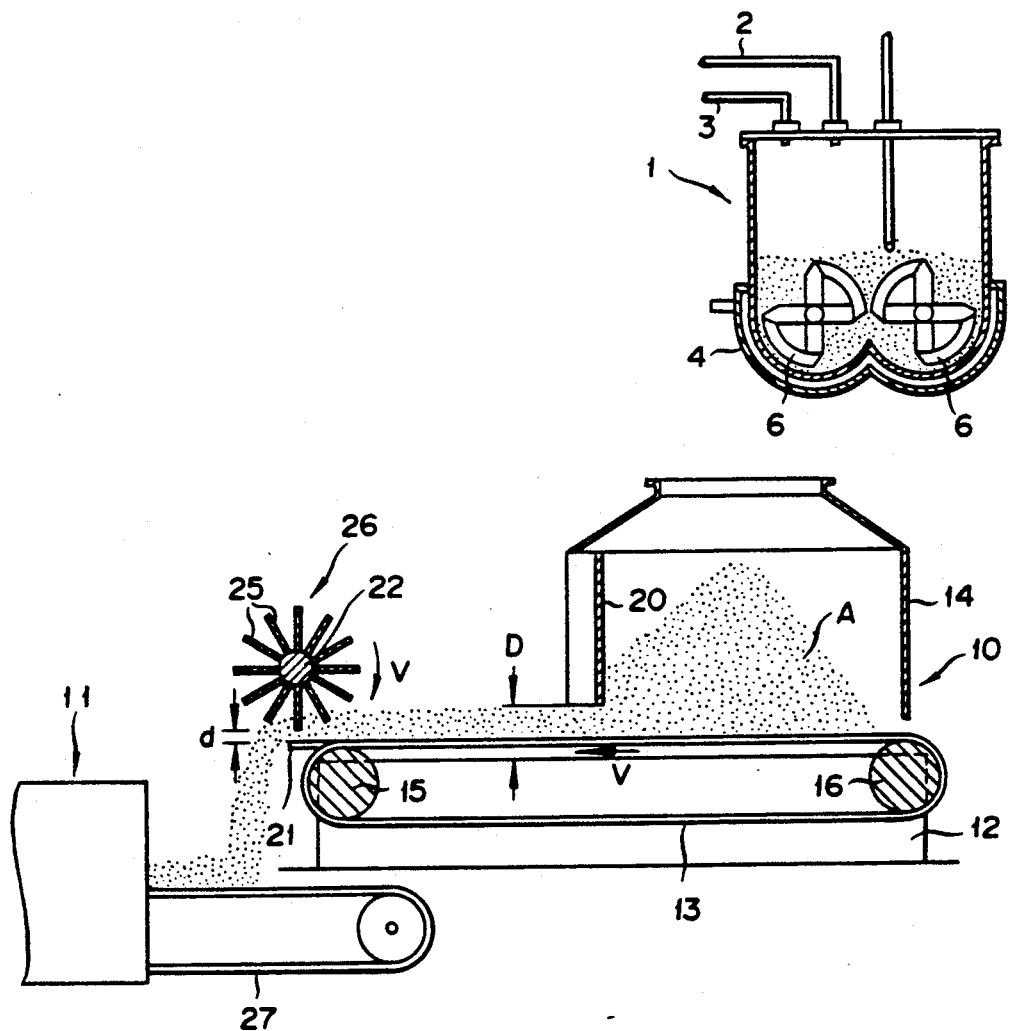
FIG. 1 is a cross section illustrating a typical apparatus for metering the supply of a material as one embodiment of this invention.

In this invention, the material placed on the conveyor has its thickness regulated to a prescribed value while in the process of being transferred by the conveyor from the incoming end to the outgoing end thereof. This thickness is set at a value such that the phenomenon of slippage will not occur between the material and the conveyor. At this time, the material assumes a compacted state throughout the entirety of its thickness. The upper side part of the layer of the material which has gained in bulk density owing to the compaction is loosed by the scraping member and discharged in the loose state. Because of the removal of the upper side part of the layer of the material by the action of the scraping member, the lower side part thereof not discharged by the scraper discharged from the conveyor has a small thickness and a proportionately weak binding force and, therefore, assumes a similarly loose state at the time of its discharge from the conveyor. As the result, the material is transferred uninterruptedly to the next step. Thus, the supply of the material can be continuously carried out with high accuracy.

Although the material thus discharged is sometimes packed and shipped as a product, it is usually charged to the following steps such as drying, secondary working, etc. In such case, the material discharged by the above-mentioned method for metered supply is supplied to the following step by another conveyor (hereinafter referred to "second conveyor"). The second conveyor is positioned at the same level of the above mentioned conveyor (hereinafter referred to "first conveyor") or at lower level of the first conveyor. When the second conveyor is positioned at the same level of the first conveyor, the conveying velocity of the second conveyor is preferable higher than that of the first conveyor. By setting higher velocity of the second conveyor, the material positioned at the lower part not discharged by the scraper provided with the conveying end of the first conveyor becomes the state that the material is loosened and the capacity for metered supply increases. On the other hand, when the second conveyor is positioned at the lower position of the first conveyor, the material positioned at the lower part not discharged by the scraper provided with the conveying end of the first conveyor becomes the state that the material is loosened by dropping from the conveying end of the first conveyor and is charged to the second conveyor. Therefore, the material at upper portion which is discharged by the scraper provided with the conveying end of the first conveyor and the material at lower portion which is not discharged by the scraper become loosened at the same time. Further, when the second conveyor is positioned at a lower position than the first conveyor, the second conveyor preferably has a higher velocity than the first conveyor in order to increase the capacity of the metered supply.

The apparatus of this invention for metering the supply of a material is enabled substantially to accomplish the objects of the invention by satisfying exclusively the requirements for construction described above. When the second conveyor is positioned lower than the first conveyor, depending on the amount of the material to be delivered to the incoming end of the conveyor, for example, there is the possibility that the material will fall off the outgoing end of the first conveyor after the pattern of an avalanche so violent as to disrupt the metering property of the apparatus. The first conveyor, therefore, is desired to be provided at the outgoing end thereof with a platelike member possessing a material guiding surface substantially flush with the upper surface of the first conveyor. The length of the platelike member in the direction of conveyance is not particularly limited but may be suitably selected depending on the amount of the material to be delivered and the viscosity and other physical properties of the material. Generally, this length is desired to be in the range of 50 to 500 mm, preferably 100 to 300 mm.

For this invention, the kind of the material to be handled is not critical. The invention manifests its effect particularly conspicuously for a wet material. The term "wet material" as used herein refers to a material which exhibits viscosity on absorption of water. Hydrated gels of hydrophilic polymers may be cited as typical examples of the wet material. Particularly when the hydrophilic polymer is what has been obtained by polymerizing a monomer component containing 50 to 100% by weight, preferably 75 to 100% by weight, of acrylic acid (or a salt thereof) neutralized to a ratio in the range of 0 to 100 mol %, preferably 50 to 90 mol %, with the hydroxide of an alkali metal or ammonia, the method of this invention operates effectively in particular because the viscosity to be assumed by the polymer is strong.

Although the method for the production of the hydrophilic polymer is not specifically limited, when the method is carried out batchwise, large amount of the hydrated gel of the hydrophilic polymer is discharged intermittently, so the method for metered supply in accordance with the present invention is preferably applied as an intermediated process for supplying the hydrated gel to the following step such as a drying step.

As disclosed in Japanese Patent Laid-Open SHO 57(1982)-34,101, the method for aqueous polymerization under finely dividing the hydrated gel polymer by shearing force of the rotation of plurality of the stirring blade in a vessel provided with the blades is preferable, because the product by polymerization can be directly charged to the drying step by the method for metered supply of the present invention.

The concentration of the monomer in the aqueous solution is preferably in the range of 10 to 80% by weight, preferably 20 to 60% by weight. So long as the concentration falls in the range mentioned above, the hydrated gel polymer formed in consequence of the progress of the polymerization is finely divided easily by the shearing force generated by the rotation of the stirring shaft.

The monomers which are usable in this invention include water soluble monomers such as acrylic acid and methacrylic acid and alkali metal salts or ammonium salts thereof and $\alpha, \beta$-ethylenically unsaturated monomers such as acrylamide, methacrylamide, acrylonitrile, and 2-hydroxyethyl (meth)acrylates, maleic aicd, for example. One member or a combination of two or more members selected from the group of water-soluble monomers enumerated above may be used. In such case, if necessary, methyl (meth)acrylate, ethyl (meth)acrylate, and isopropyl (meth)acrylate, may be used together with the above mentioned water soluble monomers in the range that the hydrophilicity is not damaged.

Where the hydrophilic polymer is an absorbent resin, a cross-linking monomer is preferably used. The cross-linking monomers which are usable herein include diacrylates or dimethacrylates of ethylene glycol, diethylene glycol, triethylene glycol, propylene glycol, 1,4-butanediol, 1,5-pentanediol, 1,6-hexanediol, neopentyl glycol, trimethylol propane, and pentaerythritol, triacrylates or trimethacrylates of trimethylolpropane and pentaerythritol, tetraacrylate or tetramethacrylate of pentaerythritol, and N,N'-methylenebisacrylamide, N,N'-methylenebismethacrylamide, and triallyl isocyanurate, for example. One member or a combination of two or more members selected from the group of cross-linking monomers enumerated above may be used. The amount of the cross-linking monomer to be used is generally not more than 10 mol %, desirably in the range of 0.005 to 5 mol %, and most desirably in the range of 0.01 to 1 mol %, based on the amount of the monomer mentioned above.

Among these monomers mentioned above, a monomer mixture which consists of at least one monomer (A) selected from the group consisting of acrylic acid, methacrylic acid, and alkali metal salts thereof or ammonium salts thereof, acrylamide, methacrylamide, and a cross-linking monomer (B) possessing at least two polymerizable double bonds in the molecular unit thereof and contains the cross-linking monomer (B) in a ratio of not more than 10 mol % proves to be particularly desirable for the present invention. As the cross-linking monomer (B), one member or a combination of two or more members selected from the group of cross-linking monomers enumerated above may be used. If the amount of the cross-linking monomer (B) to be used exceeds 10 mol % based on the amount of the monomer (A), the cross-linking polymer to be produced is deficient in absorbing capacity and ion-exchange capacity. The ratio of the cross-linking monomer (B) is preferably in the range of 0.005 to 5 mol %, more preferably in the range of 0.01 to 1 mol %. The concentration of the monomer mixture in the aqueous solution thereof is preferably in the range of 10 to 80% by weight, more preferably 20 to 60% by weight.

The invention has been described so far by adducing the case in which mainly the monomer is neutralized, as occasion demands, in a prescribed ratio. Optionally, the produced hydrophilic polymer may be neutralized either wholly or partially to the same ratio as mentioned above.

The hydrated gel polymer consequently obtained has a water content in the range of 10 to 90% by weight, preferably 30 to 80% by weight, and an average particle diameter in the range of 0.05 to 50 mm, preferably 0.5 to 20 mm.

Now, the present invention will be described below with reference to working examples illustrated in the accompanying drawings.

Example

FIG. 1 is a schematic cross section illustrating a typical apparatus for metered supply of a material as one embodiment of the present invention. This apparatus 10 was installed between a device 1 for producing a hydrated gel of absorbent resin by batch polymerization and a drying device 11 for drying the hydrated gel. It was provided with a first conveyor, i.e. a belt conveyor 13 attached to a base 12.

The producing device mentioned above was installed above the incoming end, i.e. the righthand part of the belt conveyor 13, and was operated for the production of the hydrated gel. This production was carried out as follows. A twin-arm type kneader of stainless steel having an inner volume of 1,000 liters, with two sigma type blades 6 and a jacket 4 was fitted with a lid. In the device, 550 kg of the aqueous solution of an acrylate type monomer comprising 438 kg of an aqueous sodium acrylate solution, 41.4 kg of acrylic acid, and 70.6 kg of deionized water (monomer concentration 37% by weight and neutralization ratio 75 mol %) via a material supply inlet 3 and 0.1 kg of N,N'-methylenebisacrylamide were placed and swept with nitrogen gas introduced via a nitrogen gas inlet 2 to displace the gas entrapped in the reaction system.

Then, the two sigma type vanes 6 were rotated at a rate of 30 rpm and the kneader was heated by passing hot water at 25° C. through the jacket 4 and, at the same time, 0.14 kg of ammonium persulfate and 0.2 kg of sodium hydrogen sulfite were added as polymerization initiators to the mixture in the kneader. The monomer component began to polymerize five minutes after the addition of the polymerization initiators. The internal temperature of the reaction system reached 92° C. within 20 minutes of the addition of the initiators, with the produced hydrated gel polymer finely divided into particles 1 to 5 mm in diameter. The polymerization was completed in 60 minutes. Then, the hydrated gel was removed from the kneader.

The removed hydrated gel was thrown onto the belt conveyor 13 via a hopper 14 which, as illustrated in FIG. 1, was installed above the incoming side of the belt conveyor 13. This belt conveyor 13 was passed round a driving roller 15 and a following roller 16 both attached to the base 12. In order for the belt conveyor 13 to be advanced in the direction of the arrow shown in FIG. 1 by a motor 17 disposed on a supporting base, a chain 18 was passed, as illustrated in FIG. 1, around a sprocket fixed on the main shaft of the motor 17 and a sprocket fixed to the driving roller 15.

Figure 2:
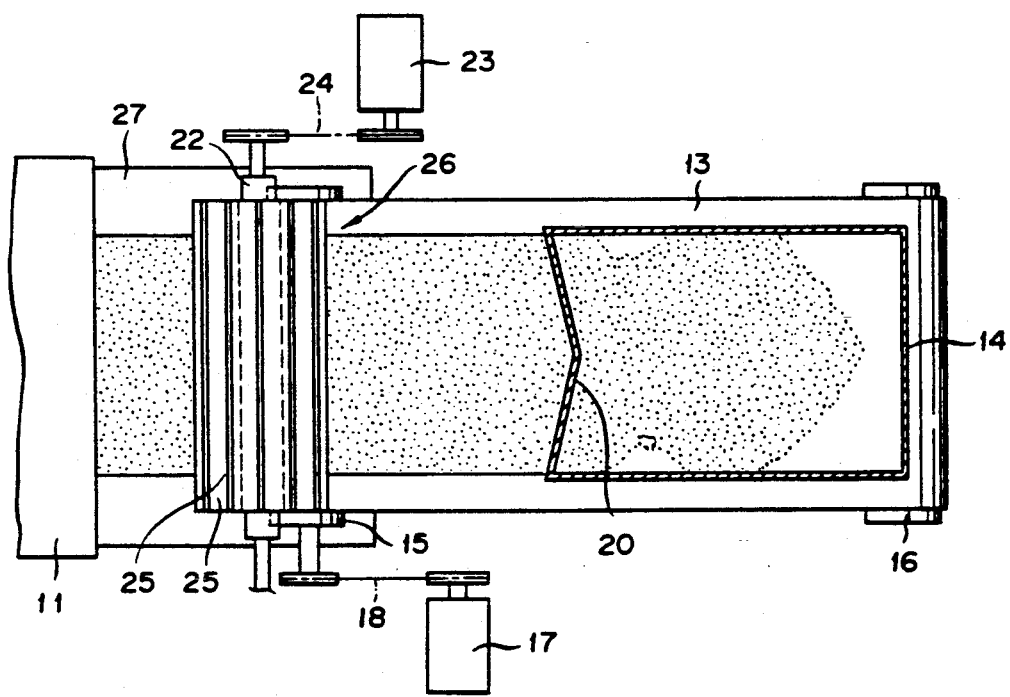
FIG. 2 is a laterally sectioned plan view of FIG. 1.

To the hopper 14, a gate member 20 was integrally joined. This gate member 20, as illustrated in FIG. 2, was bent at the central part thereof falling in the middle of the width of the belt conveyor 13 toward the downstream side relative to the opposite lateral edges of the conveyor 13 so as to assume the shape of the letter V written in a widely divergent pattern. When the hydrated gel was thrown in a heaped state, as illustrated in FIG. 1, onto the incoming end of the conveyor 13 and the conveyor 13 was advanced, the heap of the hydrated gel was regulated to the thickness, d, equalling the gap between the lower surface of the gate member 20 and the upper surface of the conveyor 13 while the part of the heap positioned in the middle portion of the width of the conveyor was pressed against the opposite lateral edges.

Optionally, in the place of the gate member 20, a roller may be incorporated in the hopper 14 and operated to regulate the thickness of the heap of the hydrated gel being advanced on the belt conveyor 13.

The belt conveyor 13 was provided at the left end thereof with a platelike member, i.e. a receiving plate 21, disposed flush with the upper surface of the conveyor 13. This receiving plate 21 constituted itself the outgoing end of the belt conveyor 13. The receiving plate 21 had a length proportionate to the width of the belt conveyor 13. The receiving plate 21 as used in the illustrated embodiment had, in the direction of advance of the conveyor 13, a size in the range of 150 to 200 mm. The receiving plate 21 so disposed effectively prevented the hydrated gel from falling after the pattern of an avalanche. Above the left end part of this receiving plate 21, a rotary shaft 22 was supported rotatably by a supporting member (not shown) as held substantially perpendicularly to the direction of advance of the belt conveyor 13. This rotary shaft 22 was adapted to be driven by a motor 23 through the medium of a chain 24 which was passed round a sprocket fixed to the motor 23 and a sprocket fixed to the rotary shaft 22 as illustrated in FIG. 2. This rotary shaft 22 was so disposed that the axis thereof would vertically coincide substantially with the left edge of the aforementioned receiving plate 21.

Figure 3:
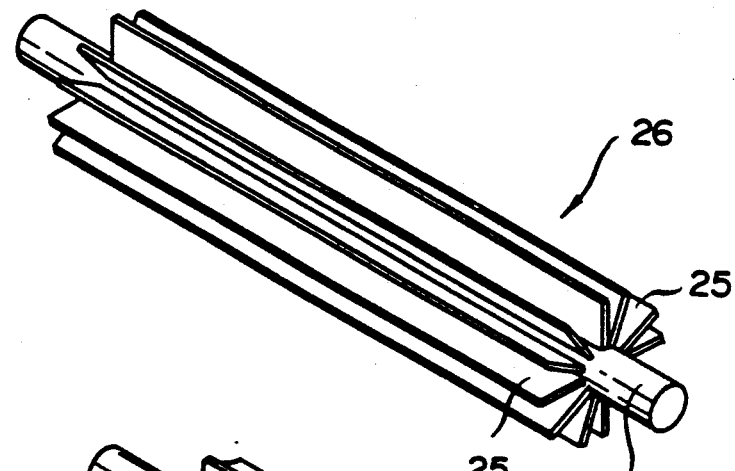
FIG. 3 is a perspective view illustrating a scraper shown in FIG. 1 and FIG. 2, FIGS. 4 (A) to (C) are perspective views illustrating typical scrapers as other embodiments of this invention, FIG. 5 (A) is a cross section illustrating a typical apparatus for metering the supply as yet another embodiment of this invention, FIG. 5 (B) is a perspective view illustrating the scraping device shown in FIG. 5 (A)

On the rotary shaft 22, a multiplicity of blade members 25 destined to constitute a scraping member were radially fixed (shown in FIG. 3). These blade members 25 possessed a width proportionate to the width of the conveyor 13 and a uniform length from the axis of the rotary shaft 22 to the leading end of the blade members.

A scraper 26 consisted of the rotary shaft 22 and the blade members 25. In the illustrated embodiment, a total of 12 blade members 25 were circumferentially spaced at angular intervals of 30° relative to the axis of the rotary shaft 22.

Since the rotary shaft 22 was adapted to be rotated in the direction indicated by the arrow, the blade members 25 were moved in the direction of advancing the heap of the hydrated gel being transferred on the belt conveyor 13 in consequence of the rotation of the rotary shaft 22. The revolving speed of the leading ends of the blade members 25, namely the peripheral speed v was set at a level in the range of 5 to 500 times the conveying speed, V, of the belt conveyor 13. A gap, d, was allowed to intervene between the leading end of the blade member 25 rotated to the lowermost level and the upper surface of the belt conveyor 13. This gap d was set at a magnitude approximately in the range of $\frac{3}{4}$ to $\frac{1}{4}$, preferably $\frac{1}{2}$ to $\frac{1}{3}$, of the aforementioned gap D.

The hydrated gel advanced by the belt conveyor 13 and regulated to the aforementioned thickness D by the gate member 20 was pressed down while in the process of passing the gate member 20 and consequently caused to acquire a relatively high bulk density throughout the entirety of the thickness. The thickness, D, was approximately in the range of 300 to 1,000 mm, preferably 350 to 700 mm. When the thickness, D, of the hydrated gel was transferred infallibly without entailing the phenomenon of slippage on the conveyor 13.

When the layer of hydrated gel A was brought to the position above the receiving plate 21 forming the outgoing end of the conveyor 13, part of the blade members 25 as scraping members plunged down into the hydrated gel layer A of the thickness D to a depth in the range of $\frac{3}{4}$ to $\frac{1}{4}$ of the thickness D and disintegrated and scraped the upper side part of the hydrated gel layer in the direction of conveyance at a peripheral speed greater than the conveying speed of the conveyor 13. As the result, the upper side part of the hydrated gel layer which had been compacted under pressure and had consequently gained in bulk density was discharged in a disintegrated state onto the drying device 11 by the blade members 25 and, at the same time, the lower side part of the hydrated gel layer was pushed forward by the upper side part of the hydrated gel being advanced by the conveyor and was discharged onto a second conveyor, i.e., a conveyor 27 and charged to the drying device 11. In such case, conveying speed of the conveyor 27 is 3 to 50 times to the speed V of the conveyor 13. Since the lower side part of the hydrated gel layer had a small thickness and a proportionately small binding force, it was readily disintegrated and discharged. The part of the layer removed by the blade members 25 and the part discharged from the belt conveyor 13 were thoroughly disintegrated and delivered continuously to the drying device 11 for the next step of treatment. To the next step, therefore, the hydrated gel as a material was supplied infallibly in a prescribed rate with high accuracy.

Figure 4A:
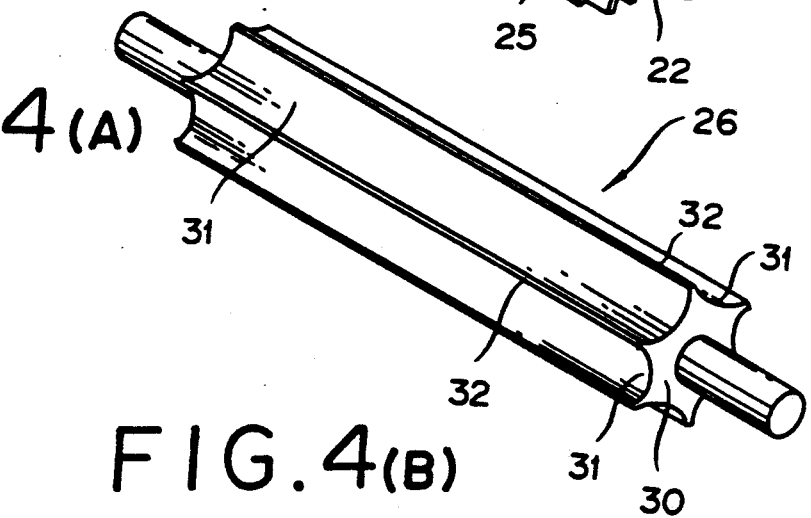
Figure 4B:
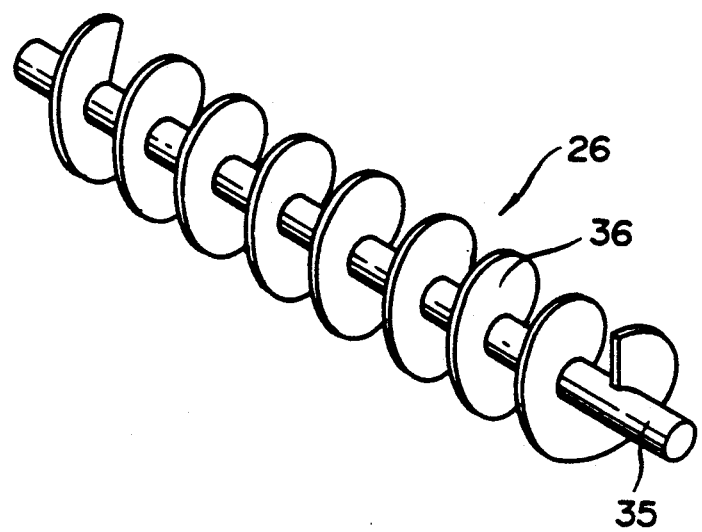

FIG. 4 (A) is a diagram illustrating a scraping device 26 in another embodiment of the invention. A cylindrical rotary member 30 was provided on the circumferential boundary thereof with a multiplicity of depressed surfaces 31 which were extended straight throughout the entire axial length of the rotary member 30. Owing to this configuration, a plurality of scraping members 32 of a small width extended in the direction of width of the belt conveyor 13 were formed. In this embodiment, the action of scraping the upper side part of the hydrated gel layer was obtained similarly to the preceding embodiment.

FIG. 4 (B) is a diagram illustrating a scraping device 26 in yet another embodiment of the present invention. In this case, a rotary shaft 35 was provided on the circumferential boundary thereof with a spirally continuous ribbonlike blade 36. The upper side part of the hydrated gel layer was subjected to the moving force generated by the spiral blade 36 in the direction of width of the belt conveyor 13 and, at the same time, to the disintegrating force produced by the blade 36 owing to the partial velocity of its rotation in the direction of conveyance coupled with the fact that the hydrated gel itself possessed viscosity and consequently exhibited an inclination to adhere to the blade 36. The disintegrated hydrated gel was discharged to the next step. In this case, the disintegrating force was manifested conspicuously.

When the direction of the spiral curve of the spiral blade 36 illustrated in FIG. 4 (B) was reversed in the central part of the rotary shaft 35, the hydrated gel subjected to the disintegrating action was gathered in the central part in the direction of width of the belt conveyor 13 or moved away toward the opposite lateral parts of the belt conveyor 13.

By making further use of the fact that the hydrated gel, because of its viscosity, had an inclination to adhere to the blade, such a modification of the scraping device 26 as illustrated in FIG. 4 (C) could be realized. On a rotary shaft 38, a multiplicity of rod members 39 were radially projected. These rod members 39 served as a scraping member. In this case, though the hydrated gel on the conveyor 13 was not scraped off all at once throughout the entire width of the belt conveyor 13, part of the hydrated gel was scraped off. The part of the hydrated gel which adjoined to the particular part which had been scraped off was entrained by the scraped part because of the viscosity and, consequently, subjected to the disintegrating action exerted upon the hydrated gel similarly to the embodiments described above.

Figure 5B:
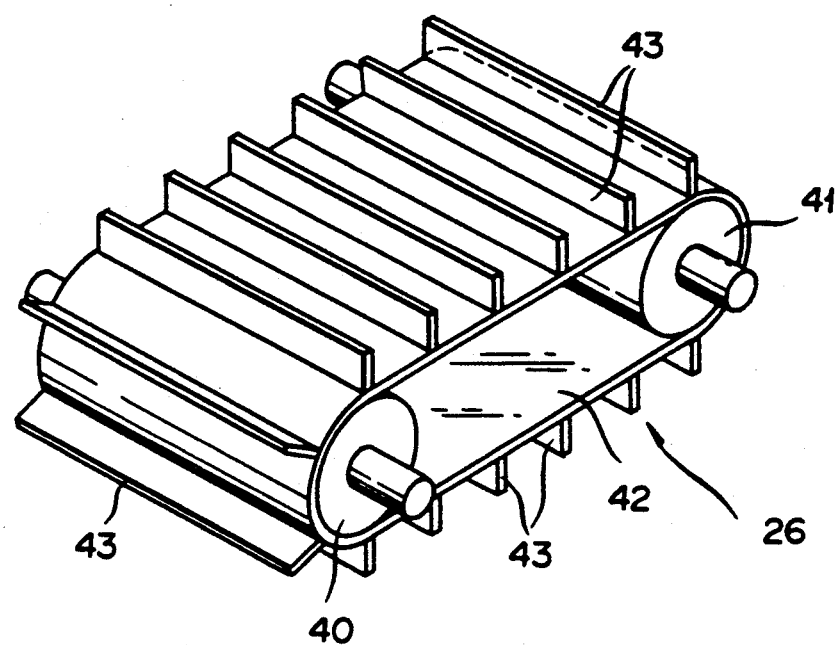

FIGS. 5 (A) and (B) are diagrams illustrating apparatuses for metering the supply of a material as other embodiments of the present invention. Unlike the apparatuses illustrated in FIG. 1 and FIG. 2, these apparatuses had no gate member 20 incorporated in the hopper 14 and were adapted instead to rely upon the scraping device 26 for the fulfilment of the function of the gate member 20. This scraping device 26, as illustrated in FIG. 5 (B), was provided with an outgoing side roller 40 positioned above the receiving plate 21 and an incoming side roller 41 positioned on a higher level on the incoming side of the conveyor 13. An endless belt 42 was passed round the rollers 40 and 41. This belt 42 was inclined in such a manner that the distance between the belt 42 and the belt conveyor 13 decreased in the direction of the outgoing end of the conveyor as illustrated. On the circumferential surface of this belt 42, a multiplicity of blade members 43 extended in the direction of width were spaced at fixed intervals. Also in this case, since the moving speed, v, of the leading ends of the blade members 43 was greater than the moving speed, V, of the belt conveyor 13, the hydrated gel thrown onto the belt conveyor 13 was pressed against the lower surface of the belt 42, eventually regulated in thickness and, at the same time, disintegrated by being scraped off by the blade members 43.

In an experimental operation of the apparatus for metered supply illustrated in FIG. 1 to FIG. 3, the hydrated gel introduced from the aforementioned twin-arm type kneader onto the incoming end of the belt conveyor 13 under the conditions mentioned above was transferred on the belt conveyor 13 to the drying device 11, with the conveying speed, V, set at 0.06 m/min, the peripheral speed, v, at 4 m/min, the gap, D, at 500 mm, and the gap, d, at 200 mm respectively. The hydrated gel was introduced into the drying device 11 and spread on the belt of the drying device 11 in the form of a fluffy layer having a uniform thickness in the range of 45 to 50 mm and having no compacted texture. Inside the drying device 11, the hydrated gel was continuously dried for 120 minutes with hot air supplied therein at a temperature of 150° C. As the result, a dry polymer having a water content in the range of 5 to 7% by weight was obtained. When this dry polymer was treated with a pulverizer, an absorbent resin powder composed of particles measuring not more than 1 mm in diameter was obtained.

It was not desirable to decrease the aforementioned size, d, close to zero because the small size caused the scraping member rather to compact the hydrated gel than to disintegrate it. The function of thoroughly disintegrating the hydrated gel and simultaneously discharging it to the next step was attained fully by causing the upper side part of the hydrated gel layer to be disintegrated and discharged by the scraping member.

Figure 6:
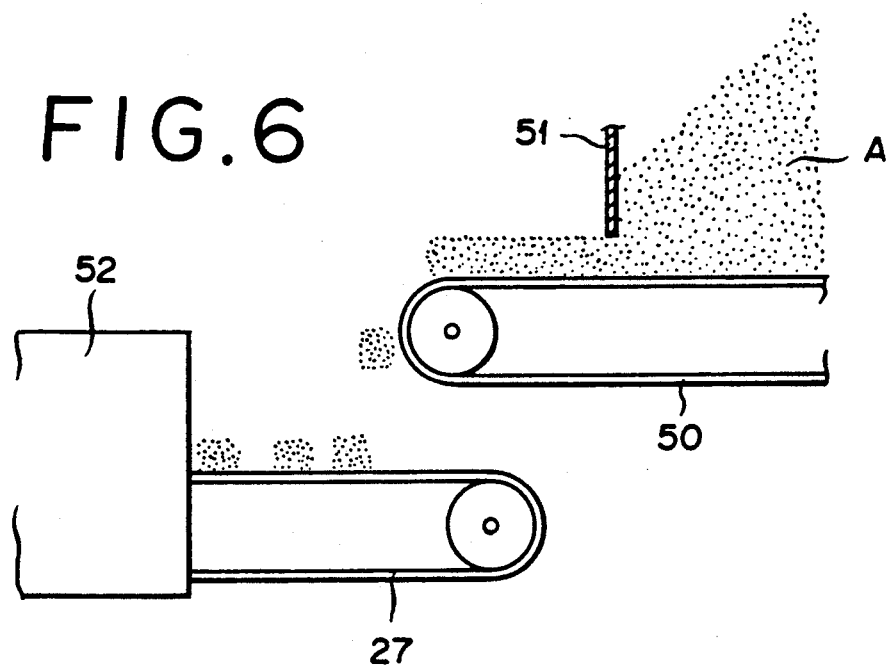
FIG. 6 is a schematic perspective view illustrating a conventional apparatus for metering the supply of a material.

To facilitate the comprehension of the basic principle and the operation and effect of this invention, the configuration of the apparatus for metered supply which was tried during the course of development of this invention is schematically illustrated in FIG. 6. In this case, the hydrated gel thrown onto a belt conveyor 50 was passed through a gate 51 and then introduced into a drying device 52 by the motion of the belt conveyor 50. From the outgoing end of the belt conveyor 50, however, the hydrated gel fell down in separate blocks and formed heaps on the conveyor of the drying device 52. When these heaps in the drying device 52 were dried for 10 hours with a forced current of hot air at 150° C., the hot air failed to reach the interiors of the heaps. Consequently, the heaps emanating from the drying device contained undried gel in their interiors. When the heaps were manually crushed and supplied to a pulverizer, the undried hydrated gel clogged the drying device and eventually stopped device.

Industrial Applicability

As described above, in accordance with the present invention, the material in the process of transfer on the conveyor is regulated to a thickness such that the phenomenon of slippage will not occur between the conveyor and the material and, during the course of the regulation of thickness, the material is caused to gain in bulk density owing to the action of compaction under the pressure. The upper side part of the compacted layer of the material, on reaching the outgoing end of the conveyor, is cut and scraped and discharged by the scraping member to the next step. In the meantime, the lower side part of the compacted layer of the material not discharged by the scraping member is thin enough to be sufficiently loosed exclusively by the force of motion of the conveyor owing to the aforementioned removal of the upper side part by the scraping member. The material discharged from the conveyor, therefore, is as a whole in a sufficiently loose state and thus is continuously delivered to the next step. The metered supply of the material, accordingly, is accomplished infallibly with high accuracy.

In accordance with the method of this invention which produces a hydrophilic polymer by the use of the aforementioned apparatus for metered supply, since the hydrated gel polymer formed by the batch polymerization is supplied to the drying device without being compacted under pressure, the produced hydrophilic polymer contains absolutely no undried hydrated gel polymer and the hydrophilic polymer can be produced in a notably improved productivity.

We claim:

1. A method for producing a hydrophilic polymer, comprising:

preparing a finely divided hydrated gel polymer by batch polymerization;

supplying said polymer, before any drying, to an apparatus for metered supply of said polymer, said apparatus having a first conveyor and a second conveyor, wherein said first conveyor has an incoming end and an outgoing end and carries said polymer at a given rate from the incoming end to the outgoing end;

regulating the thickness of said polymer on said first conveyor to 300 to 1000 mm while said polymer is carried on said first conveyor prior to raking;

raking an upper part of said polymer with a raking member arranged above said outgoing end to disintegrate and discharge said upper part of said polymer from said first conveyor to said second conveyer while said lower part of said polymer is discharged from said outgoing end onto said second conveyor wherein said second conveyor carries said polymer at a higher rate of speed then the speed of said first conveyor; and supplying said polymer from said second conveyor to a continuous drying apparatus to dry said polymer.

2. A method according to claim 1, wherein said raking member moves in a direction for conveying by disintegrating and discharging said polymer past said outgoing end.

3. A method according to claim 1, wherein said hydrophilic polymer has been obtained by polymerizing a monomer component containing 50 to 100 parts by weight of an acrylic acid (or salt thereof).

4. A method according to claim 1, wherein said hydrated gel polymer has a water content in the range of 10 to 90% by weight.

5. A method according to claim 1, wherein said hydrated gel polymer has an average particle diameter in the range of 0.05 to 50 mm.

6. A method according to claim 1, wherein said hydrated gel polymer is obtained by a polymerization in a reaction vessel provided with a plurality of rotary blades.

7. A method according to claim 3, wherein said hydrophilic polymer is an absorbent resin.

8. A method according to claim 6, wherein said reaction vessel is a twin arm type kneader.

* * * * *

UNITED STATES PATENT AND TRADEMARK OFFICE
CERTIFICATE OF CORRECTION

PATENT NO. : 5,229,487
DATED : July 20, 1993
INVENTOR(S) : Tsuneo TSUBAKIMOTO et al It is certified that error appears in the above-indentified patent and that said Letters Patent is hereby corrected as shown below:

On the title page:
In Section [86], delete "PCT/JP89/00108" and insert -- PCT/JP89/01108 --.

Signed and Sealed this

Fifteenth Day of February, 1994

Attest:

BRUCE LEHMAN

*Attesting Officer*     *Commissioner of Patents and Trademarks*